(12) United States Patent
Shi (10) Patent No.: US 12,377,330 B1
(45) Date of Patent: Aug. 5, 2025

(54) PORTABLE BADMINTON NET RACK

(71) Applicant: Dongguan Hongyu Plastic Co., Ltd., Guangdong (CN)

(72) Inventor: Juying Shi, Guangdong (CN)

(73) Assignee: Dongguan Hongyu Plastic Co., Ltd., Dongguan (CN)

( * ) Notice: Subject to any disclaimer, the term of this patent is extended or adjusted under 35 U.S.C. 154(b) by 0 days.

(21) Appl. No.: 18/801,909

(22) Filed: Aug. 13, 2024

(30) Foreign Application Priority Data

Jun. 19, 2024 (CN) ............................ 202421415543

(51) Int. Cl.
| | |
|---|---|
| A63B 61/00 | (2006.01) |
| A63B 61/02 | (2006.01) |
| A63B 67/18 | (2016.01) |
| A63B 71/00 | (2006.01) |
| A63B 102/04 | (2015.01) |

(52) U.S. Cl.
CPC ............ *A63B 61/003* (2013.01); *A63B 61/02* (2013.01); *A63B 67/18* (2013.01); *A63B 71/0045* (2013.01); *A63B 2102/04* (2015.10); *A63B 2210/50* (2013.01)

(58) Field of Classification Search
CPC ....... A63B 61/003; A63B 61/02; A63B 67/18; A63B 71/0045; A63B 2102/04; A63B 2102/10; A63B 2102/16; A63B 2102/36; A63B 2210/50; A63B 60/58; A45C 11/00
See application file for complete search history.

(56) References Cited

U.S. PATENT DOCUMENTS

| | | | | |
|---|---|---|---|---|
| 4,262,798 A | * | 4/1981 | Raab ...................... | A63B 60/58 |
| | | | | 473/553 |
| 4,842,134 A | * | 6/1989 | Chang .................... | A45C 13/02 |
| | | | | 206/579 |
| 6,367,624 B1 | * | 4/2002 | Szczepanski ........ | B65D 81/133 |
| | | | | 206/443 |
| 6,450,333 B1 | * | 9/2002 | McClenahan ........ | B65D 21/086 |
| | | | | 220/8 |
| 2021/0291032 A1 | * | 9/2021 | Zhou .................. | A63B 71/0036 |
| 2023/0279689 A1 | * | 9/2023 | Banjo ..................... | E04H 12/34 |
| | | | | 248/528 |

FOREIGN PATENT DOCUMENTS

| | | | | |
|---|---|---|---|---|
| CN | 216293266 | * | 4/2022 | ............. A45C 11/00 |
| CN | 219743838 | * | 9/2023 | ............. A63B 60/58 |

* cited by examiner

*Primary Examiner* — John E Simms, Jr.
(74) *Attorney, Agent, or Firm* — Cooper Legal Group, LLC (57) ABSTRACT

A portable badminton net rack includes a box, a first support rod, a second support rod, a net, a battledore and a badminton, the box includes an upper box and a lower box hinged to the upper box, an accommodation groove is defined in the lower box, the accommodation groove is configured to accommodate the net, the battledore and the badminton, the first support rod and the second support rod are each configured as a telescopic rod and are hinged to two sides of the lower box, respectively, each side of the net is provided with a connecting bush, and when the portable badminton net rack is in a use state, a first connecting bush of the two connecting bushes is sleeved on the first support rod, and a second connecting bush of the two connecting bushes is sleeved on the second support rod.

8 Claims, 6 Drawing Sheets

PORTABLE BADMINTON NET RACK

CROSS-REFERENCE TO RELATED APPLICATION

This application claims the priority to Chinese patent application serial no. 202421415543.5, filed on Jun. 19, 2024. The entirety of Chinese patent application serial no. 202421415543.5 is hereby incorporated by reference herein and made a part of this specification.

TECHNICAL FIELD

The present application relates to the field of badminton net rack technologies, and in particular, to a portable badminton net rack.

BACKGROUND ART

In order to enable badminton fans to play badminton anytime and anywhere, some portable badminton net racks appear on the market. However, the assembly of these badminton net racks takes times, additionally, it is often necessary to use a heavy object or fixture to fix the support rod of the net, resulting in inconvenience for the user.

SUMMARY

In order to improve use experiences of a badminton net rack, the present application provides a portable badminton net rack.

The following technical solution is adopted for the portable badminton net rack according to the present application.

The portable badminton net rack includes a box, a first support rod, a second support rod, a net, a battledore and a badminton, the box includes an upper box and a lower box, the upper box is hinged to the lower box, an accommodation groove is formed in the lower box, the accommodation groove is configured to accommodate the net, the battledore and the badminton, the first support rod and the second support rod are hinged to two sides of the lower box, respectively, the first support rod and the second support rod are each configured as a telescopic rod, each of two sides of the net is provided with a connecting bush, and when the portable badminton net rack is in a use state, a first connecting bush of the two connecting bushes is sleeved on the first support rod, and a second connecting bush of the two bushes is sleeved on the second support rod.

In the above technical solution, a box structure is adopted, and the net, the battledore and the badminton are neatly accommodated in the box, such that carrying and storage are more convenient and faster. Secondly, the first support rod and the second support rod are designed as telescopic rods and hinged to two sides of the box respectively, such that the support part of the portable badminton net rack may be adjusted as required, so as to adapt to the use in different places. Furthermore, two sides of the net are each provided with a connecting bush. When the portable badminton net rack is in use, one connecting bush is sleeved on the first support rod, and the other connecting bush is sleeved on the second support rod, such that the net may be stably supported without an additional heavy object or fixture, thus bringing great convenience to the user, and improving the use experiences of the user of the badminton net rack.

Optionally, lock assemblies are provided both between the first support rod and the lower box and between the second support rod and the lower box, each of the lock assemblies includes an adjustable rotary joint and a buckle, the lower box is configured with an assembly groove, the adjustable rotary joint is rotationally arranged in the assembly groove, a first end of the adjustable rotary joint is configured to be in inserted in a respective one of the first support rod and the second support rod, the buckle is slidably arranged on the adjustable rotary joint, a locking slot is formed in a groove wall of the assembly groove, and when the portable badminton net rack is in the use state, the buckle is inserted in the locking slot.

By adopting the above technical solution, the first support rod and the second support rod may be firmly connected with the lower box, and the locking both between the first support rod and the lower box and between the second support rod and the lower box is realized by connection of the adjustable rotary joint and the buckle. Specifically, in the use state, the buckle is inserted in the locking slot, which guarantees the stability and reliability of the support structure, thereby providing good use experiences.

Optionally, the lock assembly further includes a key lock, an end cover, a first reset spring and a second reset spring, the end cover is configured to be covered on a second end of the adjustable rotary joint, the key lock is slidably arranged on the end cover, a first end of the first reset spring is fixed to the end cover, a second end of the first reset spring is fixed to the key lock, a first inclined surface is provided on a side wall of the key lock, a second inclined surface is provided on a side wall of the buckle, the first inclined surface is configured to be slidable relative to the second inclined surface, a first end of the second reset spring is fixed to the adjustable rotary joint, and a second end of the second reset spring is fixed to the buckle.

By adopting the above technical solution, after the user presses the key lock, the key lock slides to compress the first reset spring. The first inclined surface slides relative to the second inclined surface, such that the key lock may press the buckle to slide the buckle, so as to compress the second reset spring, such that the buckle is separated from the locking slot to realize the unlocking. When the user releases the key lock, under the elastic forces of the first reset spring and the second reset spring, the key lock and the buckle are reset.

Optionally, a collecting box is provided in the accommodation groove, the collecting box is open upward, and the collecting box is configured to place the net.

By adopting the above technical solution, the net is independently placed in the collecting box, so as to effectively prevent the net from being mixed with other accessories, thus reducing disorder and confusion during assembly.

Optionally, two limit columns are provided in the accommodation groove, the two limit columns are parallel to each other, and the two limit columns are configured to cooperate with each other to clamp a racket bar of the battledore.

By adopting the above technical solution, through the two limit columns the racket bar of the battledore may be effectively fixed, which ensures that the racket bar will not shake or slide during storage and carrying, thereby providing a stable supporting, thus reducing damage or disorder possibly caused during movement or transportation, and meanwhile, which is convenient for the user to take and use the battledore.

Optionally, a positioning ring is fixed on a groove wall of the accommodation groove, an inner diameter of the positioning ring is matched with an outer diameter of the badminton, and the positioning ring is configured to hold the badminton.

By adopting the above technical solution, it is ensured that the badminton may be placed on the badminton net rack stably and prevented from sliding or dropping. The inner diameter of the positioning ring is matched with the outer diameter of the badminton, which provides a stable positioning and supporting point for the badminton, such that the badminton may be firmly clamped in the positioning ring, thereby guaranteeing an accurate and stable position of the badminton.

Optionally, a positioning block is further fixed at the groove wall of the accommodation groove, the positioning ring is configured to surround the positioning block, a shape of the positioning block is matched with an interior shape of the badminton, and the badminton is suitable to be sleeved on the positioning block.

By adopting the above technical solution, the shape of the positioning block is matched with the interior shape of the badminton, which provides an accurate positioning point for the badminton, such that the badminton may be more conveniently and rapidly sleeved on the positioning block.

Optionally, an inner wall of the upper box is projectively formed with a limit block, and when the upper box and the lower box are closed, a side wall of the limit block abuts against an end of the badminton.

The above technical solution guarantees the stable position of the badminton in a closed state of the box, which further reduces the possibility of movement or sliding of the badminton during storage or carrying.

Optionally, a placement recess is formed in a surface of the upper box, a position of the placement recess is configured to correspond to a position of the limit block, and the placement recess is configured to place a water cup.

By adopting the above technical solution, the user may place the water cup in the placement recess conveniently, such that the water cup may be stored conveniently while the badminton net rack is used, so as to meet a drinking requirement during exercise.

Optionally, plates are fixed at the inner wall of the upper box, a limit notch is formed in a side wall of each of the plates, and when the upper box and the lower box are closed, both the first support rod and the second support rod are clamped in the limit notches respectively.

By adopting the above technical solution, it is ensured that the first support rod and the second support rod are clamped in the limit notches respectively when the upper box and the lower box are closed, thus guaranteeing stable positions of the support rods during transportation or storage, and preventing shaking or dislocation of the support rods during transportation.

In summary, the present application may achieve at least one of the following beneficial effects.

1. A box structure is adopted, and the net, the battledore and the badminton are neatly accommodated in the box, such that carrying and storage are more convenient and faster. The design ensures that all parts of the badminton net rack will not be placed disorderly, thus facilitating the assembly and disassembly in use.

2. The locking assemblies are arranged both between the first support rod and the lower box and between the second support rod and the lower box, thus guaranteeing the stability and reliability of the support structure. A combination of assemblies, such as the key lock, the reset spring, or the like, realizes a firm connection between the support rod and the box, thereby effectively avoiding looseness or falling in the use state.

DETAILED DESCRIPTION

The present application will be further described below in details with reference to FIGS. 1 to 5.

Figure 1:
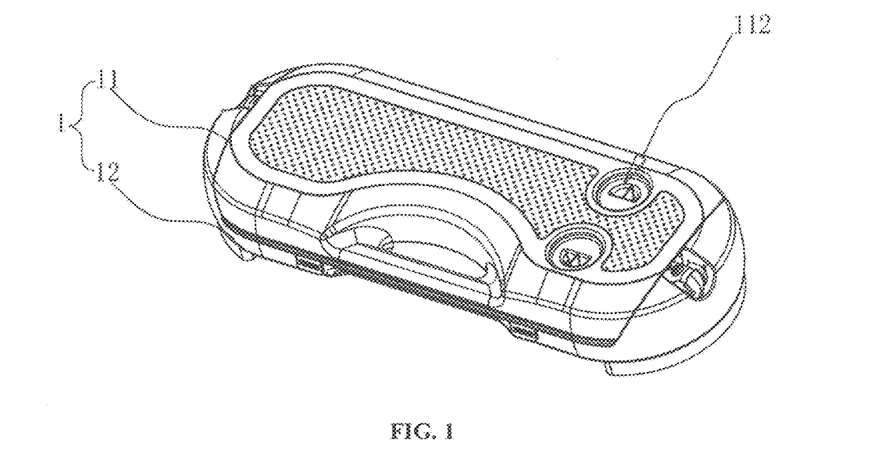
FIG. 1 is a schematic diagram of an overall structure according to an embodiment of the present application.
Figure 2:
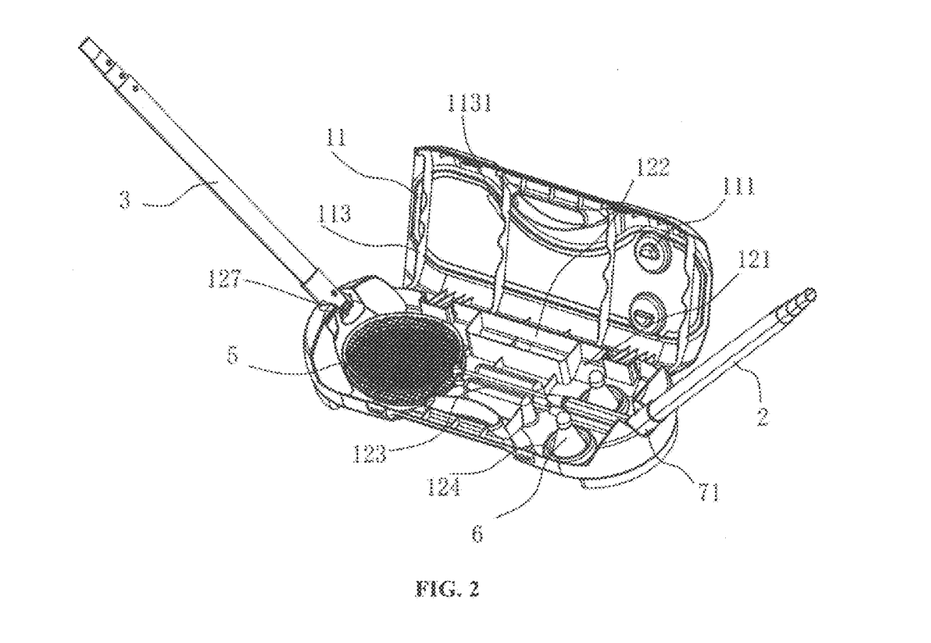
FIG. 2 is a schematic structural diagram of an opened portable badminton net rack according to the embodiment of the present application.

An embodiment of the present application discloses a portable badminton net rack. Referring to FIGS. 1 and 2, the portable badminton net rack includes a box 1, and the box 1 is shaped as a rectangular parallelepiped. The box 1 includes a lower box 12 and an upper box 11, and a lower edge of the upper box 11 is hinged to an upper edge of the lower box 12 to realize opening and closing of the box 1.

Figure 3:
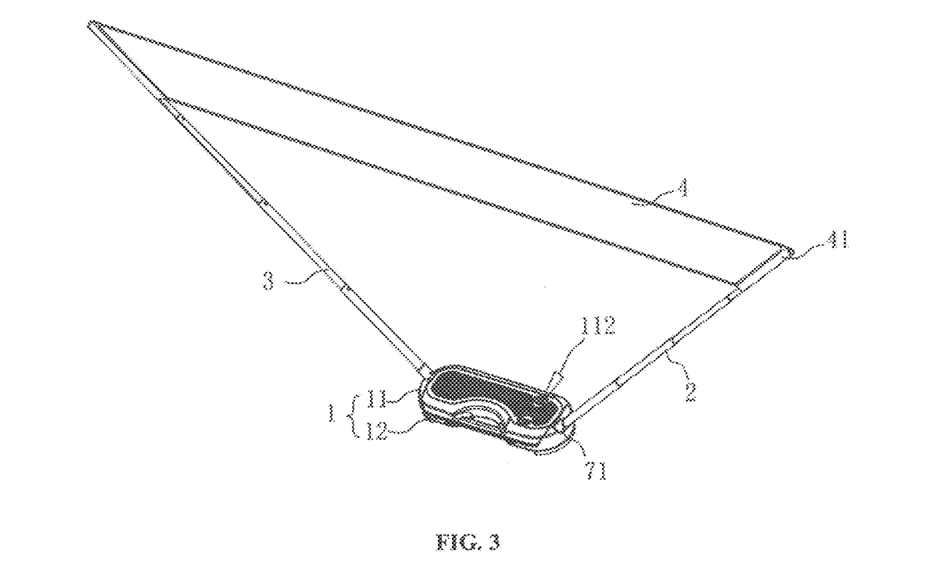
FIG. 3 is a schematic structural diagram of the portable badminton net rack according to the embodiment of the present application in a use state.

Referring to FIGS. 2 and 3, the portable badminton net rack further includes a first support rod 2, a second support rod 3, a net 4, a battledore 5 and a badminton 6. Correspondingly, an accommodation groove 121 is formed in an upper surface of a cover of the lower box 12, and the accommodation groove 121 is configured to accommodate the net 4, the battledore 5 and the badminton 6.

Specifically, a collecting box 122 is fixed at a groove wall of the accommodation groove 121, and the top of the collecting box 122 is vertically opened upwards. The collecting box 122 is configured to place the net 4. The net 4 is independently placed in the collecting box 122, such that the net 4 can be effectively prevented from being mixed with other accessories, thus reducing disorder and confusion during assembly.

Further, two limit columns 123 are fixed at the groove wall of the accommodation groove 121, and the two limit columns 123 are spaced apart in the width direction of the lower box 12 and parallel to each other. The limit column 123 extends in a length direction of the lower box 12. The two limit columns 123 cooperate with each other to clamp the racket bar of the battledore 5, that is, when the battledore 5 is placed in the accommodation groove 121, opposite side walls of the two limit columns 123 abut against two side walls of the racket bar of the battledore 5, respectively.

Therefore, through the two limit columns 123, the racket bar of the battledore 5 may be effectively fixed, so as to ensure that the racket bar may not shake or slide during storage and carrying, which provides a stable support, thus reducing the damage or disorder possibly caused during movement or transportation, and meanwhile, which is convenient for the user to take the battledore 5.

On the other hand, a positioning ring 124 is fixed at the groove wall of the accommodation groove 121, in the present embodiment, two positioning rings 124 are provided, and the two positioning rings 124 are spaced apart in a horizontal direction. Correspondingly, two badmintons 6 are provided. The inner diameter of the positioning ring 124 is matched with the outer diameter of the badminton 6, and the two badmintons 6 are clamped in the two positioning rings 124, respectively.

When the badminton 6 is stored in the accommodation groove 121, the periphery of feathers of the badminton 6 abuts against an inner wall of the positioning ring 124, thereby ensuring that the badminton 6 may be stably placed on the badminton net rack, to prevent from sliding or dropping. Meanwhile, the inner diameter of the positioning ring 124 is matched with the outer diameter of the badminton 6, which provides a stable positioning and supporting point for the badminton 6, such that the badminton 6 may be firmly clamped in the positioning ring 124, thereby ensuring an accurate and stable position of the badminton 6.

Further, two positioning blocks 125 are further fixed at the groove wall of the accommodation groove 121, and the two positioning blocks 125 are positioned corresponding to the two positioning rings 124, respectively. Specifically, the positioning ring 124 surrounds the positioning block 125. A shape of the positioning block 125 is matched with the interior shape of the badminton 6, and the badminton 6 is sleeved on the positioning block 125. That is, when the user sleeves the badminton 6 on the positioning block 125, an inner wall of the badminton 6 is attached to an outer wall of the positioning block 125, thus providing an accurate positioning point for the badminton 6, such that the badminton 6 may be sleeved on the positioning block 125 more conveniently and rapidly.

Furthermore, the inner wall of the upper box 11 is projectively formed with two limit blocks 111, and positions of the two limit blocks 111 correspond to the positions of the two positioning blocks 125 respectively. When the upper box 11 and the lower box 12 are closed, a side wall of the limit block 111 abuts against an end of the badminton 6, thereby ensuring the stable position of the badminton 6 in the closed state of the box 1, and further reducing a possibility of movement or sliding thereof during storage or carrying.

Further, a placement recess 112 is formed in a surface of the upper box, the number of the placement recesses 112 is correspondingly two, and positions of the two placement recesses 112 correspond to the positions of the two limit blocks 111 respectively. The placement recess 112 is configured to place a water cup, such that the water cup may be stored conveniently while the badminton net rack is used, so as to meet the drinking requirement during exercise.

On the other hand, the first support rod 2 and the second support rod 3 are hinged to two sides of the lower box 12, respectively, and the first support rod 2 and the second support rod 3 are both configured as telescopic rods. After the first support rod 2 and the second support rod 3 are retracted, the first support rod 2 and the second support rod 3 rotate towards the interior of the box 1, and thus, the first support rod 2 and the second support rod 3 may be accommodated in the accommodation groove 121.

It should be noted that the hinged position between the first support rod 2 and the lower box 12 and the hinged position between the second support rod 3 and the lower box 12 are staggered from each other in the width direction of the lower box 12. Therefore, when rotationally accommodated in the accommodation groove 121, the first support rod 2 and the second support rod 3 are staggered from each other, thereby guaranteeing the placing stability of the first support rod 2 and the second support rod 3.

Further, plates 113 are fixed at the inner wall of the upper box 11, and a limit notch 1131 is formed in a side wall of each plate 113. When the upper box 11 and the lower box 12 are closed, both the first support rod and the second support rod are clamped in the limit notches 1131, thus guaranteeing stable positions of the support rods during transportation or storage, and preventing shaking or dislocation of the support rods during transportation.

Figure 4:
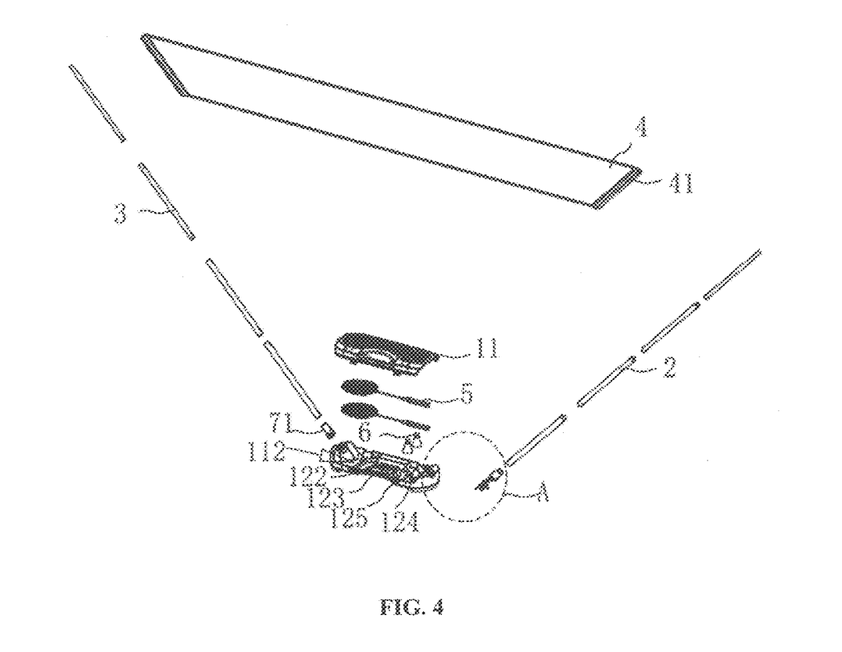
FIG. 4 is an exploded view of the portable badminton net rack according to the embodiment of the present application.
Figure 5:
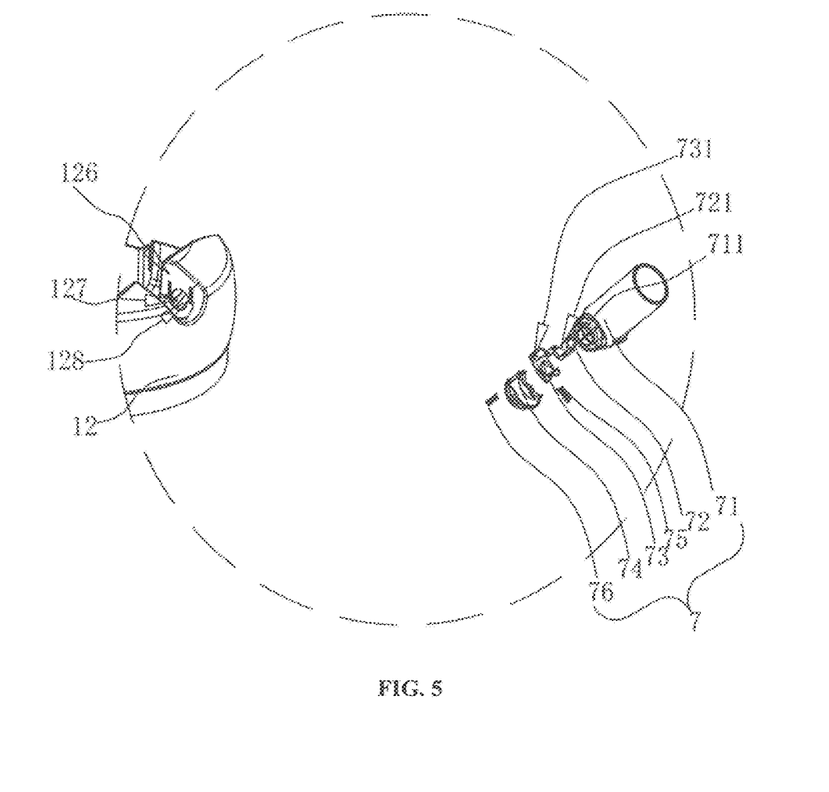
FIG. 5 is a schematic enlarged diagram of portion A in FIG. 4.

Referring to FIGS. 4 and 5, specifically, lock assemblies 7 is provided both between the first support rod 2 and the lower box and between the second support rod 3 and the lower box 12, and the lock assembly 7 includes an adjustable rotary joint 71, a buckle 72, a key lock 73, an end cover 74, a first reset spring 75 and a second reset spring 76. Since the connection and position relationships between the first support rod 2 and the lock assembly 7 are the same as that between the second support rod 3 and the lock assembly 7, only the connection and position relationships between the first support rod 2 and the lock assembly 7 are described below.

Correspondingly, an assembly groove 126 is formed in a side wall of the lower box 12, and the adjustable rotary joint 71 is rotationally provided in the assembly groove 126. The first support rod 2 is configured to be inserted into one end of the adjustable rotary joint 71. A concave 127 is formed in a groove wall of the assembly groove 126, a bump 711 is fixed at a side wall of the adjustable rotary joint 71, and the bump 711 is rotationally supported in the concave 127, such that the lower box 12 may rotationally support the adjustable rotary joint 71.

Furthermore, the buckle 72 is slidably provided at the other end of the adjustable rotary joint 71. In the present embodiment, a sliding direction of the buckle 72 is the same as the width direction of the lower box 12. Meanwhile, a locking slot 128 is formed in the groove wall of the assembly groove 126, and the locking slot 128 is located on one side of the concave 127. When the portable badminton net rack is in a use state, the buckle 72 is inserted in the locking slot 128, such that rotation of the adjustable rotary joint 71 is limited, to realize fixation between the first support rod 2 and the lower box 12.

In summary, in order to firmly connect the first support rod 2 and the second support rod 3 with the lower box 12, the adjustable rotary joint 71 is connected with the buckle 72, so as to lock the first support rod 2 and the second support rod 3 with the lower box 12. Specifically, in the use state, the buckle 72 is inserted in the locking slot 128, which guarantees the stability and reliability of the support structure, thereby providing good use experiences.

Figure 6:
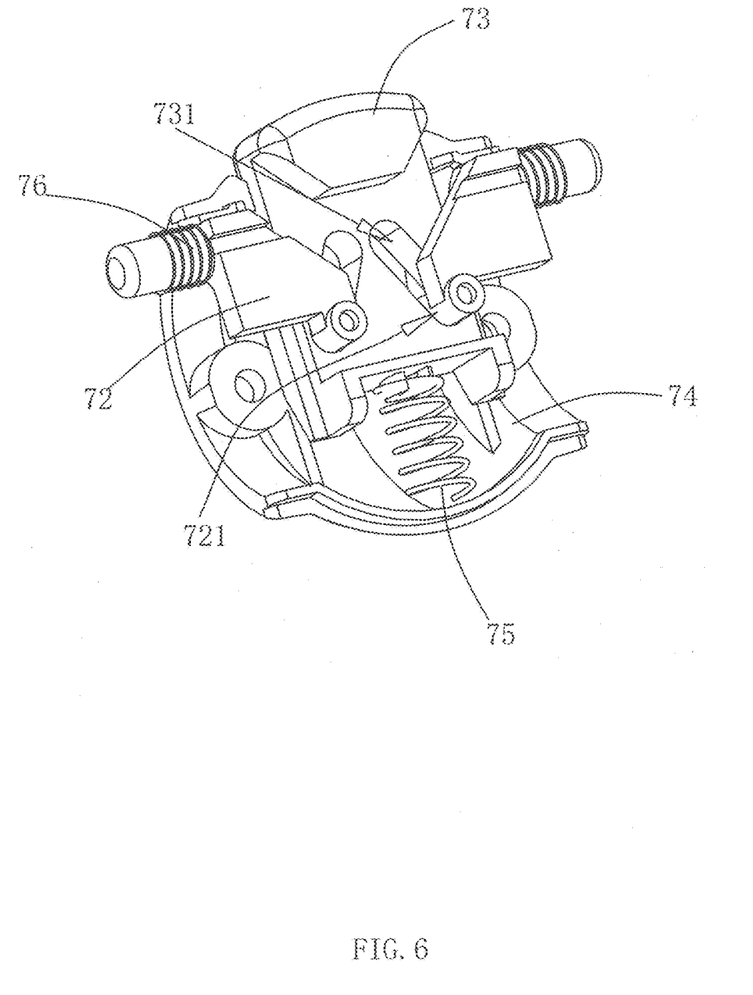
FIG. 6 is an assembled diaphragm of a lock assembly.
Figure 7:
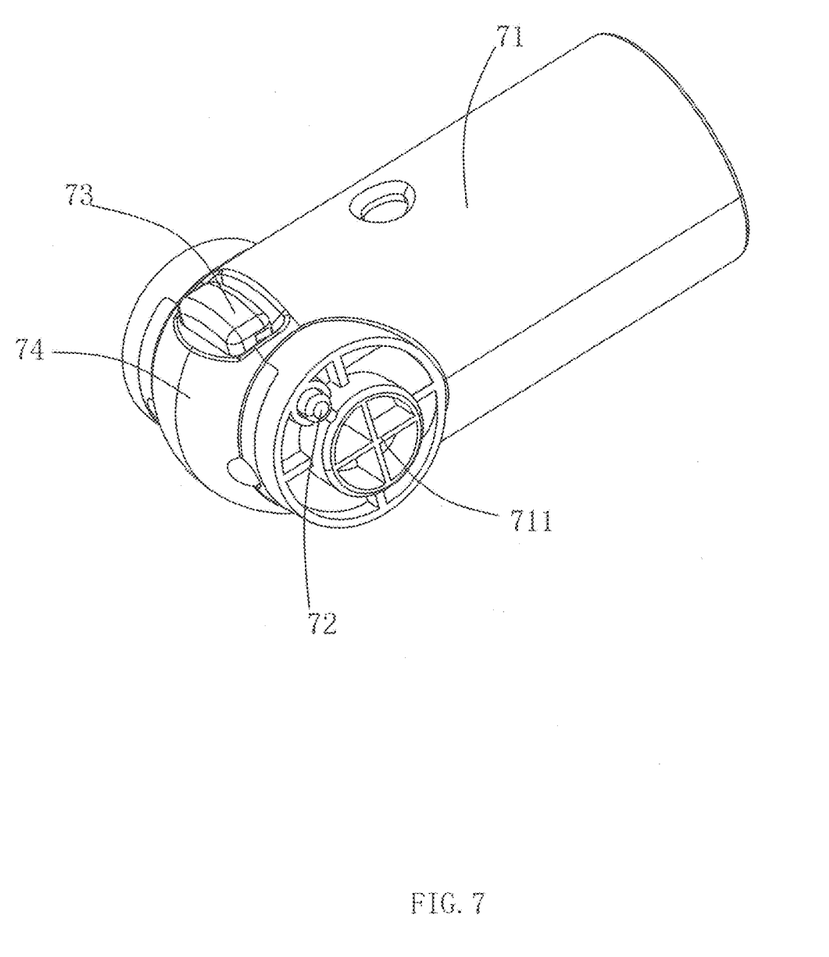
FIG. 7 is an assembled diaphragm of the lock assembly from another perspective.
Figure 8:
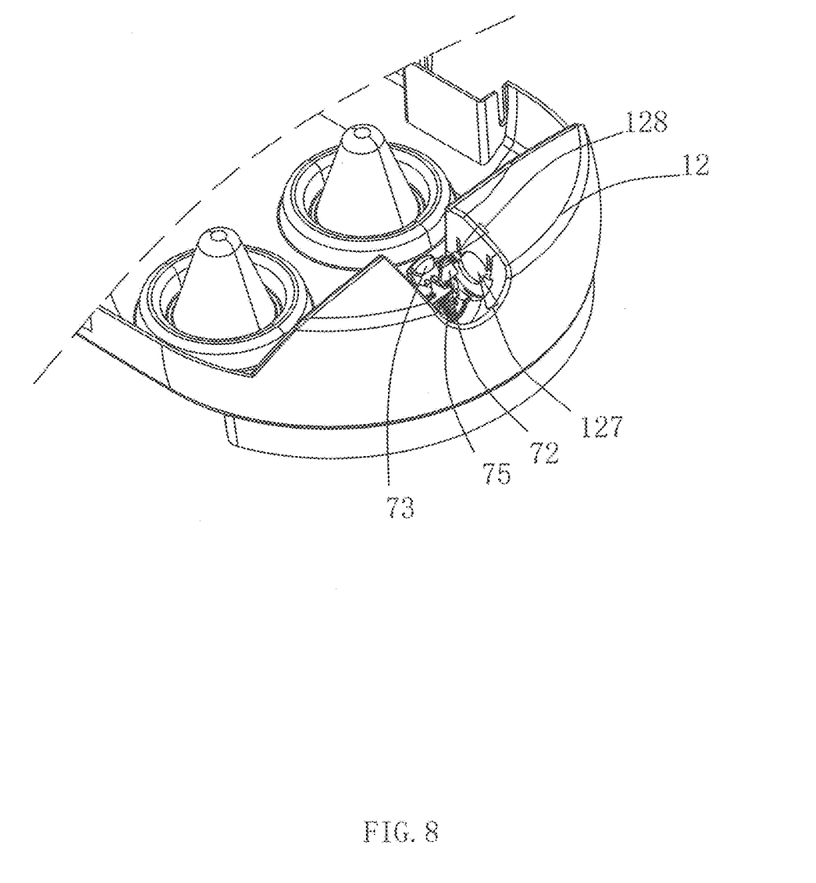
FIG. 8 is an assembled diaphragm of the lock assembly from another perspective.

Correspondingly, in the above process, the sliding of the buckle 72 is controlled by the cooperation of the key lock 73, the first reset spring 75 and the second reset spring 76 as follows.

Specifically, the end cover 74 is covered on an end of the adjustable rotary joint 71 away from the first support rod 2, the key lock 73 is slidably provided on the end cover 74, and the sliding direction of the key lock 73 is perpendicular to the sliding direction of the buckle 72. One end of the first reset spring 75 is fixed to the end cover 74, the other end of the first reset spring 75 is fixed to the key lock 73, and the length direction of the first reset spring 75 extends along the sliding direction of the key lock 73.

Correspondingly, the first inclined surface 731 is provided on a side wall of the key lock 73, the second inclined surface 721 is provided on a side wall of the buckle 72, and the first inclined surface 731 is configured to slide relative to the second inclined surface 721. One end of the second reset spring 76 is fixed to the adjustable rotary joint 71, and the other end of the second reset spring 76 is fixed to the buckle 72.

Therefore, after the user presses the key lock 73, the key lock 73 slides to compress the first reset spring 75. The first inclined surface 731 slides relative to the second inclined surface 721, such that the key lock 73 may press the buckle 72 to slide the buckle 72, so as to compress the second reset spring 76, such that the buckle 72 is separated from the locking slot 128 to realize the unlocking. When the user releases the key lock 73, under the elastic forces of the first reset spring 75 and the second reset spring 76, the key lock 73 slides oppositely, and meanwhile, the buckle 72 also slides oppositely, such that the first inclined surface 731 slides relative to the second inclined surface 721 in an opposite direction, thereby resetting the key lock 73 and the buckle 72.

The portable badminton net rack according to the embodiment of the present application is implemented as follows.

In the present application, a box structure is adopted, and the net 4, the battledore 5 and the badminton 6 are neatly accommodated in the box 1, such that carrying and storage are more convenient and faster. Secondly, the first support rod 2 and the second support rod 3 are designed as telescopic rods and hinged to two sides of the box 1 respectively, such that the support part of the portable badminton net rack may be adjusted as required, so as to adapt to the use in different places. Furthermore, two sides of the net 4 are each provided+ with a connecting bush 41. When the portable badminton net rack is in use, one connecting bush 41 is sleeved on the first support rod 2, and the other connecting bush 41 is sleeved on the second support rod 3, such that the net 4 can be stably supported without an additional heavy object or fixture, thus bringing great convenience to the user, and improving the use experiences of the user of the badminton net rack.

The above embodiments are preferred embodiments of the present application, and the protection scope of the present application is not limited thereby, and therefore, equivalent changes made according to the structure, shape and principle of the present application shall be covered by the protection scope of the present application.

LIST OF REFERENCE SIGNS 1 box
11 upper Box
111 limit block
112 placement recess
113 plate
1131 limit notch
12 lower Box
121 accommodation groove
122 collecting Box
123 limit column
124 positioning Ring
125 positioning Block
126 assembly groove
127 concave
128 locking slot
2 first Support Rod
3 second Support Rod
4 net
41 connecting bush
5 battledore
6 badminton
7 lock assembly
71 adjustable rotary joint
711 bump
72 buckle
721 second inclined surface
73 key lock
731 first inclined surface
74 end cover
75 first reset spring
76 second reset spring

What is claimed is:

1. A portable badminton net rack, comprising a box, a first support rod, a second support rod, a net, a battledore and a badminton, wherein the box comprises an upper box and a lower box, the upper box is configured to be hinged to the lower box, an accommodation groove is defined in the lower box, the accommodation groove is configured to accommodate the net, the battledore and the badminton, the first support rod and the second support rod are hinged to two sides of the lower box, respectively, the first support rod and the second support rod are each configured as a telescopic rod, each of two sides of the net is provided with a connecting bush, and when the portable badminton net rack is in a use state, a first connecting bush of the two connecting bushes is sleeved on the first support rod, and a second connecting bush of the two connecting bushes is sleeved on the second support rod, wherein lock assemblies are provided between the first support rod and the lower box and between the second support rod and the lower box, each of the lock assemblies comprises an adjustable rotary joint and a buckle, the lower box is configured with an assembly groove, the adjustable rotary joint is rotationally arranged in the assembly groove, a first end of the adjustable rotary joint is configured to be in inserted in a respective one of the first support rod and the second support rod, the buckle is slidably arranged on the adjustable rotary joint, a locking slot is formed in a groove wall of the assembly groove, and when the portable badminton net rack is in the use state, the buckle is inserted in the locking slot, wherein each of the lock assemblies further comprises a key lock, an end cover, a first reset spring and a second reset spring, the end cover is configured to be covered on a second end of the adjustable rotary joint, the key lock is slidably arranged on the end cover, a first end of the first reset spring is fixed to the end cover, a second end of the first reset spring is fixed to the key lock, a first inclined surface is provided on a side wall of the key lock, a second inclined surface is provided on a side wall of the buckle, the first inclined surface is configured to be slidable relative to the second inclined surface, a first end of the second reset spring is fixed to the adjustable rotary joint, and a second end of the second reset spring is fixed to the buckle.

2. The portable badminton net rack according to claim 1, wherein a collecting box is provided in the accommodation groove, the collecting box is open upward, and the collecting box is configured to receive the net.

3. The portable badminton net rack according to claim 2, wherein two limit columns are provided in the accommodation groove, the two limit columns are parallel to each other, and the two limit columns are configured to cooperate with each other to clamp a racket body of the battledore.

4. The portable badminton net rack according to claim 2, wherein a positioning ring is fixed on a groove wall of the accommodation groove, an inner diameter of the positioning ring is matched with an outer diameter of the badminton, and the positioning ring is configured to hold the badminton.

5. The portable badminton net rack according to claim 4, wherein a positioning block is further fixed at the groove wall of the accommodation groove, the positioning ring is configured to surround the positioning block, a shape of the positioning block is matched with an interior shape of the badminton, and the badminton is configured to be sleeved on the positioning block.

6. The portable badminton net rack according to claim 5, wherein an inner wall of the upper box is projectively formed with a limit block, and when the upper box and the lower box are closed, a side wall of the limit block abuts against an end of the badminton.

7. The portable badminton net rack according to claim 6, wherein a placement recess is formed in a surface of the upper box, a position of the placement recess corresponds to a position of the limit block, and the placement recess is configured to receive a water cup.

8. The portable badminton net rack according to claim 7, wherein plates are fixed at the inner wall of the upper box, a limit notch is formed in a side wall of each of the plates, and when the upper box and the lower box are closed, both the first support rod and the second support rod are clamped in the limit notches, respectively.

\* \* \* \* \*